United States Patent [19]

Sugden

[11] Patent Number: 4,943,267
[45] Date of Patent: Jul. 24, 1990

[54] MECHANICAL DIFFERENTIAL

[75] Inventor: Kenneth B. Sugden, Rockford, Ill.

[73] Assignee: Sundstrand Corporation, Rockford, Ill.

[21] Appl. No.: 280,955

[22] Filed: Dec. 7, 1988

[51] Int. Cl.⁵ .............................................. F16H 37/06
[52] U.S. Cl. ...................................... 475/6; 475/162; 475/248
[58] Field of Search ................. 74/710, 714, 801, 803, 74/665 GA, 674; 475/6, 162, 248

[56] References Cited

U.S. PATENT DOCUMENTS

| 3,525,273 | 8/1970 | Brownstein | 74/675 |
| 3,576,143 | 4/1971 | Baits | 74/687 |
| 3,915,031 | 10/1975 | Hanson | 74/710.5 |
| 4,074,591 | 2/1978 | Dick | 74/674 |
| 4,181,041 | 1/1980 | Frost | 74/687 |
| 4,535,651 | 8/1985 | Chambers | 74/711 |
| 4,721,016 | 1/1988 | Burandt | 74/801 |
| 4,751,855 | 6/1988 | Hudson et al. | 74/801 |
| 4,768,400 | 9/1988 | McKay | 74/801 |
| 4,825,723 | 5/1989 | Martin | 74/674 X |
| 4,825,726 | 5/1989 | Schofield | 74/801 |
| 4,843,912 | 7/1989 | Quick | 74/801 |

FOREIGN PATENT DOCUMENTS 579480 11/1977 U.S.S.R. ................................ 74/714

Primary Examiner—Dwight Diehl
Attorney, Agent, or Firm—Wood, Phillips, Mason, Recktenwald & VanSanten

[57] ABSTRACT

A mechanical differential is disclosed. The mechanical differential comprises first, second and third ring gears, each having inner and outer surfaces, and first and second planet gears and two carrier rods. The first and second planet gears and first and second carrier rods are disposed within the ring gears. The first and second planet gears are engaged with the inner surface of the first ring gear. The mechanical differential further comprises two sets of planet gears, each of the sets including third and fourth planet gears. One of the sets is rotatably disposed on a third carrier rod and the other of the sets is rotatably disposed on a fourth carrier rod. The two sets of third and fourth planet gears are engaged respectively with the second and third planet gears. The two third output planet gears are further engaged with the inner surface of the second output ring gear and the two fourth planet gears are further engaged with the inner surface of the third ring gear.

23 Claims, 2 Drawing Sheets

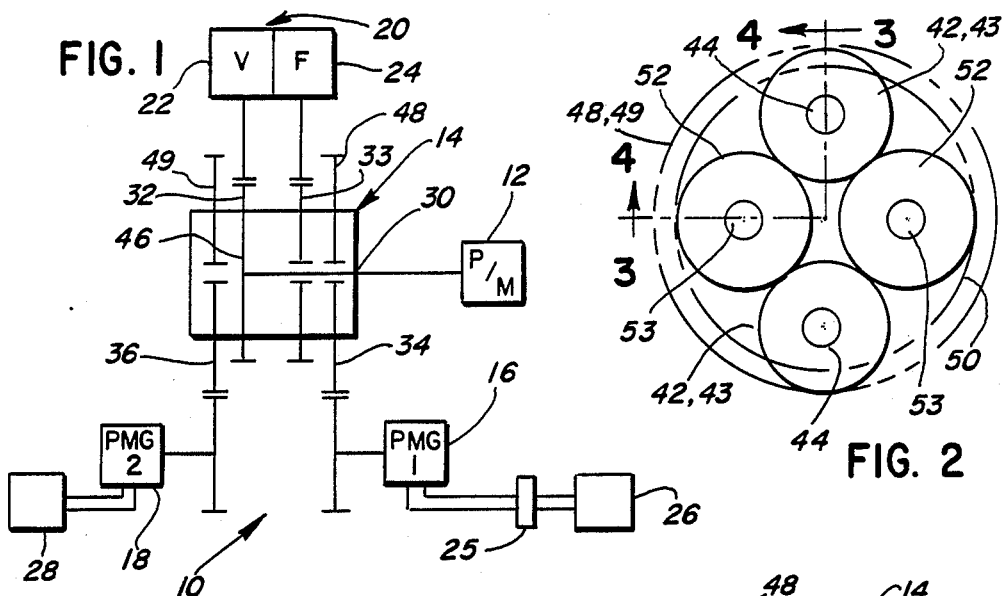
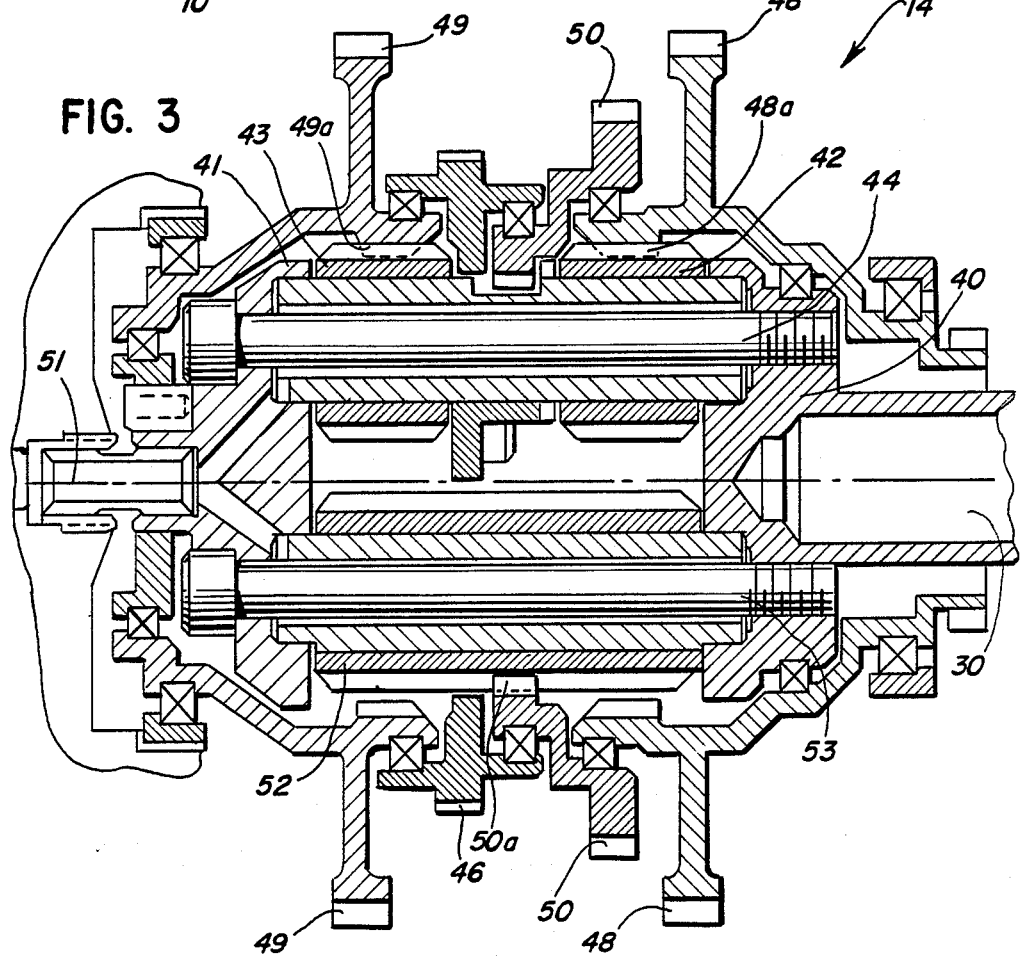

MECHANICAL DIFFERENTIAL

FIELD OF THE INVENTION

The present invention relates to a mechanical differential and, more particularly, to a mechanical differential which is useful either for coupling a prime mover to two rotary loads, each having the same load and speed characteristics or for coupling two prime movers having the same speed characteristics to drive a single rotary load.

BACKGROUND OF THE INVENTION

Typical mechanical differentials include a sun gear, a ring gear and a plurality of planet gears disposed therebetween According to this type of mechanical differential, a symmetrical load is imposed on the planet gears.

However, in another type of mechanical differential, the sun gear has been "folded" into another ring gear. According to this type of mechanical differential, the planet gears are asymmetrically loaded because the two ring gears are longitudinally offset. Such asymmetrical loading causes internal forces which are not aligned on the same longitudinal and transverse planes, causing deflection of the planet gears.

The planet gears are typically supported by journal bearings. The journal bearings must be sized sufficiently both to support the planet gears and to withstand the deflection of the planet gears. This requires the journal bearings to be relatively oversized and, hence, relatively overweight.

This invention is provided to eliminate some or all of the above problems.

SUMMARY OF THE INVENTION

In accordance with the invention, a mechanical differential is provided which comprises a carrier and a plurality of spaced concentric ring gears. The ring gears include a drive ring gear integral with the carrier, a driven ring gear having inner and outer surfaces, and first and second output ring gears having inner and outer surfaces. Means are provided for coupling the drive ring gear with the driven ring gear.

The differential further comprises two input planet gears rotatably disposed on first and second carrier rods. The input planet gears and the first and second carrier rods are disposed within the ring gears, the input planet gears being engaged with the inner surface of the driven ring gear.

Two sets of first and second output planet gears are provided, one set being rotatably disposed on a third carrier rod and the other set being rotatably disposed on a fourth carrier rod. The two sets of first and second output planet gears are engaged with the two input planet gears, the two first output planet gears being further engaged with the inner surface of the first output ring gear and the two second output planet gears are further engaged with the inner surface of the second output ring gear.

The invention also comprehends that the means coupling the drive ring gear with the driven ring gear comprises a hydraulic log unit. The hydraulic log unit may comprise means for sensing the angular velocity of the first output ring gear and means responsive to the sensing means for adjusting the angular velocity of the driven ring gear to maintain the angular velocity of the first output ring gear at a predetermined value.

The present invention further comprehends a dual permanent magnet generator. The dual permanent magnet generator comprises the mechanical differential described above in combination with a prime mover coupled to the carrier and two permanent magnet generators, wherein one of the permanent magnet generators is coupled to the first output ring gear and the other of the permanent magnet generators is coupled to the second output ring gear. Means are provided for selecting a predetermined output frequency for the one permanent magnet generator and for sensing the output frequency of the generator. The hydraulic log unit includes means for adjusting the angular velocity of the driven ring gear in response to the sensed output frequency to maintain the output frequency at the predetermined value.

Other features and advantages of the invention will be apparent from the following description taken in connection with the accompanying drawings.

BRIEF DESCRIPTION OF THE DRAWINGS

FIG. 1 is a diagrammatic schematic of a dual permanent magnet generator;

FIG. 2 is a sectional view to illustrate the planetary gear arrangement of one embodiment of the present invention;

FIG. 3 is a rotated sectional view of one embodiment of the invention, taken generally along lines 3—3 of FIG. 2;

DESCRIPTION OF THE PREFERRED EMBODIMENTS

Figure 4:
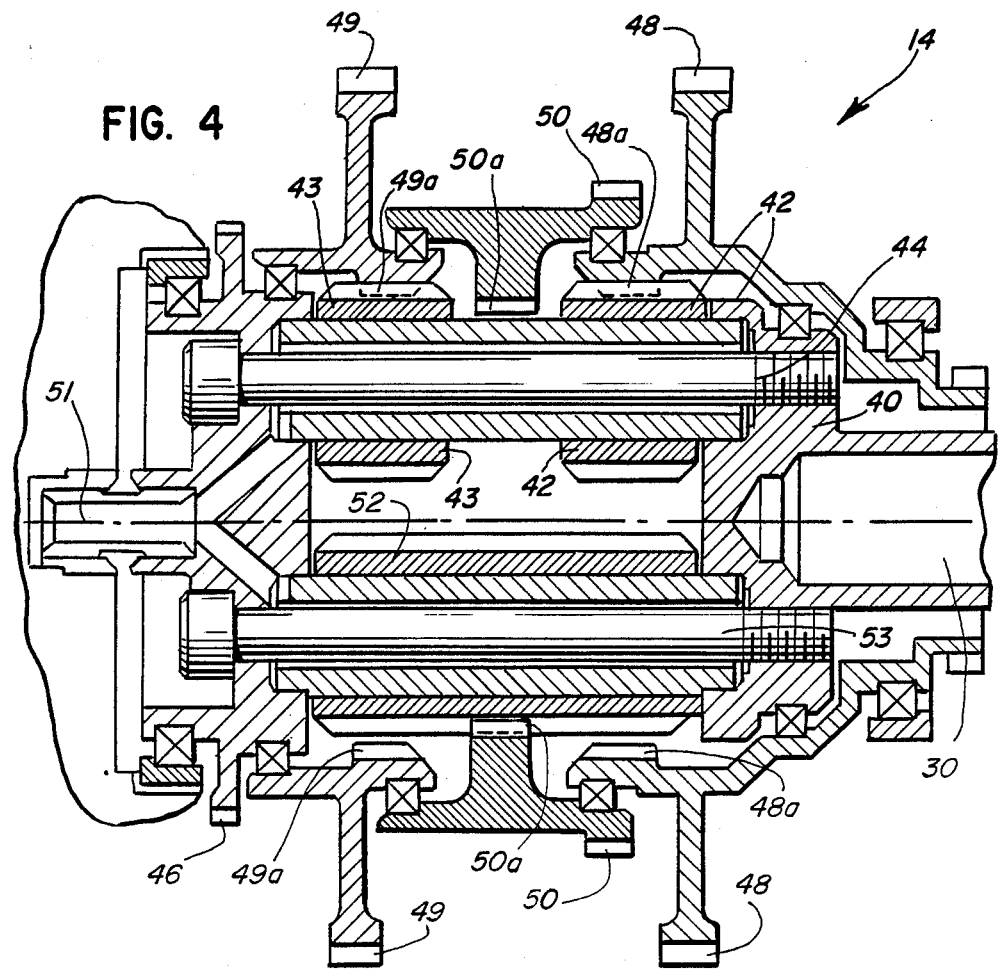
FIG. 4 is a sectional view of another embodiment of the invention similar to the view taken along lines 3—3 of FIG. 2

Referring to the drawings in greater detail, a dual permanent magnet generator generally designated 10 is illustrated in FIG. 1. The dual permanent magnet generator 10 includes a prime mover 12, a mechanical differential 14, first and second permanent magnet generators 16, 18 and a hydraulic log unit generally designated 20. The hydraulic log unit 20 includes a variable displacement hydraulic device 22 and a fixed displacement hydraulic device 24. The first and second permanent magnet generators 16, 18 are coupled to first and second loads 26 and 28, respectively.

A sensor 25 is coupled to the first permanent magnet generator 16. The sensor 25 produces an output signal proportional to either the angular velocity or the output frequency of the first permanent magnet generator 16.

The mechanical differential 14 includes a carrier input 30, a drive output 32, a driven input 33 and first and second outputs 34 and 36.

Rotation of the carrier input 30 causes concurrent rotation of the first and second outputs 34, 36 and, hence, rotation of the first and second permanent magnet generators 16, 18. As discussed in greater detail below, the angular velocity of the first and second outputs 34, 36 depends upon the angular velocity of the carrier input 30 and the relative angular velocities of the drive output 32 and the driven input 33.

The hydraulic log 20 regulates the relative angular velocity of the drive output 32 and the driven input 33, as is well known in the art. A more detailed description of the operation of a hydraulic log can be found in Baits U. S. Pat. No. 3,576,143, the specification of which is expressly incorporated by reference.

One embodiment of the mechanical differential 14 is illustrated in FIG. 3 as a rotated section taken along the lines 3—3 of FIG. 2.

The mechanical differential 14 includes a carrier 40. The carrier is secured to the carrier input 30, (FIG. 1) and hence to the prime mover 12. Journal bearings 41 carry first and second output planet gears 42 and 43, respectively, on carrier rods 44 which are secured in the carrier 40. The journal bearings 41 sandwich a drive ring gear 46 such that the drive ring gear 46 rotates integrally with the carrier 40. The first output planet gear 42 meshes with an inner toothed surface 48a of an output ring gear 48. Similarly, the second output planet gear 43 meshes with an inner toothed surface 49a of and an output ring gear 49. An inner toothed surface 50a of a driven ring gear 50 engages a pair of input planet gears 52 rotatably disposed on carrier rods 53.

The drive ring gear 46 is coupled to the variable displacement hydraulic device 22 (FIG. 1) and the driven ring gear 50 is coupled to the fixed displacement hydraulic device 24.

When the carrier 40 is rotated by rotation of the carrier input 30, and assuming all elements of the mechanical differential 14 are free to rotate, the first and second output ring gears 48, 49, the drive ring gear 46 and the driven ring gear will rotate at the same speed. The planet gears will revolve about an axis 51 of the mechanical differential 14.

If the driven ring gear 50 is held stationary, the planet gears will rotate about their axes, and the first and second output ring gears 48, 49 will be driven at an angular speed approximately twice that of the carrier, and in the same direction. The actual angular speed depends on the specific gear ratios between the planet gears and their respective ring gears. Thus by controlling the relative rotation of the driven ring gear 50 by the hydraulic log 20, the angular velocity of the first and second output ring gears 48, 49 is controlled.

As can be seen upon examination of FIG. 3, only torsional loading is imposed on the carrier rod 44 and the planet gears, without the considerable longitudinal couple forces of prior art mechanical differentials.

An alternate embodiment of the mechanical differential 14 is illustrated in FIG. 4. According to this embodiment, the drive ring gear 46 is disposed at an end of the differential gear 14. Otherwise, like numerals have been applied to like components as described in relation to FIG. 2. Operation of this alternate embodiment of the mechanical differential gear 14 is the same as that of the previously described embodiment.

Figure 5:
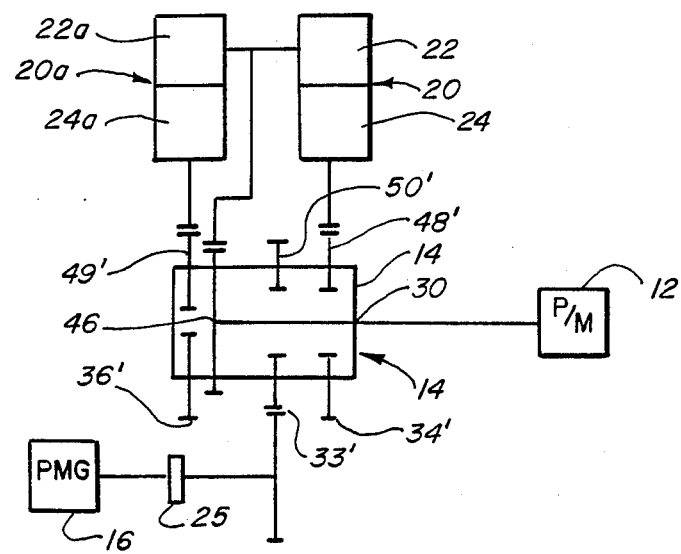
FIG. 5 is a mechanical schematic of a single permanent magnet generator coupled to a pair of hydraulic log units by a mechanical differential according to this embodiment.

As illustrated in FIG. 5, a single permanent magnet generator 16 may be coupled to a pair of hydraulic log units 20, 20a and be driven by a single prime mover 12 by the mechanical differential 14.

The mechanical differential is structurally the same as described above, but the names of certain elements are changed due to changes in their functions. Specifically, the first and second outputs 34 and 36 are first and second driven inputs 34' and 36'. The driven input 33 is a drive output 33'. The output ring gears 48 and 49 are now input ring gears 48' and 49'. Additionally, the input ring gear 50 is now an output ring gear 50' Further, the first and second output planet gears 42 and 43 are now first and second input planet gears. Finally, the input planet gears 52 are now output planet gears. The drive ring gear 46 rotates both of the variable displacement hydraulic devices 22, 22a of both the first and second hydraulic log units 20, 20a, respectively. The first and second fixed displacement hydraulic units 24, 24a drive the first and second input ring gears 48', 49' respectively. The permanent magnet generator 16 is driven by the output ring gear 50'.

From the foregoing, it will be appreciated that a mechanical differential made according to the invention is ideally suited to couple a prime mover to two rotary loads, wherein each of the rotary loads have the same load and speed characteristics. Similarly a mechanical differential made according to the invention is ideally suited to couple a single load with two hydraulic log units, each of the hydraulic log units being driven by a common prime mover.

According to the invention, the ring gears are symmetrically loaded by the planet gears. Additionally loading is split by using two input (or output) ring gears. Further each of the ring gears is driven by two planet gears, thus reducing the load on each of the planet gears by fifty percent.

It will be understood that the invention may be embodied in other specific forms without departing from the spirit or central characteristics thereof. For example, the permanent magnet generator can in fact be any type of generator, or other rotary loading device. The present examples and embodiments, therefore, are to be considered in all respects as illustrative and not restrictive, and the invention is not to be limited to the details given herein.

I claim:

1. A mechanical differential comprising:
   first, second and third ring gears, each having inner and outer surfaces;
   first and second planet gears rotatably disposed on first and second carrier rods, the first and second planet gears and said first and second carrier rods being disposed within said ring gears, said first and second planet gears being engaged with said inner surface of said first ring gear; and
   two sets of planet gears, each of said sets including third and fourth planet gears, one of said sets being rotatably disposed on a third carrier rod and the other of said sets being rotatably disposed on a fourth carrier rod, said two sets of third and fourth planet gears being engaged respectively with said first and second planet gears, said two third planet gears being further engaged with said inner surface of said second ring gear and said two fourth planet gears being further engaged with said inner surface of said third ring gear.

2. The mechanical differential of claim 1 in combination with:
   a load coupled to said first ring gear; and
   first and second prime movers having equal load and speed characteristics, said first prime mover coupled to said second ring gear and said second prime mover coupled to said third ring gear.

3. The mechanical differential of claim 1 including:
   a carrier;
   a fourth ring gear integral with said carrier; and
   means coupling said fourth ring gear with said first ring gear.

4. The mechanical differential of claim 3 in combination with:
   a prime mover coupled to said carrier; and first and second loads having the same load and speed characteristics, said first load coupled to said second ring gear and said second load coupled to said third ring gear.

5. A mechanical differential comprising:
first, second and third ring gears, each having inner and outer surfaces;
first and second planet gears rotatably disposed on first and second carrier rods, the first and second planet gears and said first and second carrier rods being disposed within said ring gears, said first and second planet gears being engaged with said inner surface of said first ring gear;
two sets of planet gears, each of said sets including third and fourth planet gears, one of said sets being rotatably disposed on a third carrier rod and the other of said sets being rotatably disposed on a fourth carrier rod, said two sets of third and fourth planet gears being engaged respectively with said first and second planet gears, said two third planet gears being further engaged with said inner surface of aid ring gear and said two fourth planet gears being further engaged with said inner surface of said third ring gear;
a prime mover coupled to a carrier member which is coupled to said first ring gear; and
first and second loads having the same load and speed characteristics, said first load coupled to said second ring gear and said second load coupled to said third ring gear.

6. A mechanical differential comprising:
a carrier;
a plurality of spaced concentric ring gears, said ring gears including a drive ring gear integral with said carrier, a driven ring gear having inner and outer surfaces, and first and second output ring gears having inner and outer surfaces;
means coupling the drive ring gear with the driven ring gear;
two input planet gears rotatably disposed on first and second carrier rods, said input planet gears and said carrier rods being disposed within said ring gears, said input planet gears being engaged with said inner surface of said driven ring gear; and
two sets of planet gears, each set including first and second output planet gears, one of said sets being rotatably disposed on a third carrier rod and the other of said sets rotatably disposed on a fourth carrier rod, said two sets of first and second output planet gears being engaged respectively with said two input planet gears, said two first output planet gears being further engaged with said inner surface of said first output ring gear and said two second output planet gears further engaged with said inner surface of said second output ring gear.

7. The mechanical differential of claim 6 wherein said means coupling the drive ring gear with the driven ring gear comprises a hydraulic log unit.

8. In combination with the mechanical differential of claim 6, a dual permanent magnet generator comprising:
a prime mover coupled to said carrier; and
two permanent magnet generators, one of said permanent magnet generators being coupled to said first output ring gear and the other of said permanent magnet generators being coupled to said second output ring gear.

9. In combination with the mechanical differential of claim 6, a dual permanent magnet generator comprising:
a prime mover coupled to said carrier;
two permanent magnet generators, one of said permanent magnet generators being coupled to said first output ring gear and the other of said permanent magnet generators being coupled to said second output ring gear;
means for selecting a predetermined output frequency for said first permanent magnet generator; and
means for sensing the output frequency of said first permanent magnet generator, wherein said hydraulic log unit includes means for adjusting the angular velocity of said driven ring gear in response to said sensed output frequency to maintain said output frequency at said predetermined value.

10. The differential gear system of claim 6 wherein said drive ring gear is disposed between said first and said second output ring gears.

11. The differential gear system of claim 6 wherein said driven ring gear is disposed between said first and said second output ring gears.

12. The differential gear system of claim 6 wherein said first output ring gear is disposed between said drive ring gear and said second output ring gear.

13. A mechanical differential comprising:
a carrier;
a plurality of spaced concentric ring gears, said ring gears including a drive ring gear integral with said carrier, a driven ring gear having inner and outer surfaces, and first and second output ring gears having inner and outer surfaces;
means coupling the drive ring gear with the driven ring gear;
two input planet gears rotatably disposed on first and second carrier rods, said input planet gears and said carrier rods being disposed within said ring gears, said input planet gears being engaged with said inner surface of said driven ring gear;
two sets of planet gears, each set including first and second output planet gears, one of said sets being rotatably disposed on a third carrier rod and the other of said sets rotatably disposed on a fourth carrier rod, said two sets of first and second output planet gears being engaged respectively with said two input planet gears, said two first output planet gears being further engaged with said inner surface of said first output ring gear and said two second output planet gears further engaged with said inner surface of said second output ring gear, wherein said means coupling the drive ring gear with the driven ring gear comprises a hydraulic log unit, said hydraulic log unit further comprises:
means for sensing the angular velocity of the first output ring gear; and
means responsive to the sensing means for adjusting the angular velocity of the driven ring gear to maintain the angular velocity of the first output ring gear at a predetermined value.

14. A differential gear system comprising:
a plurality of spaced concentric ring gears, said ring gears including first and second output ring gears having inner and outer toothed surfaces, a drive ring gear having an outer toothed surface, and a driven ring gear having inner and outer toothed surfaces and disposed between said first and second output ring gears;

a carrier integral with said drive ring gear;

means engaged with said outer toothed surface of said drive ring gear and said outer toothed surface of said driven ring gear for rotating said driven ring gear in response to rotation of said drive ring gear;

two input planet gears rotatably disposed on first and second carrier rods, said input planet gears and said carrier rods being disposed within said ring gears, said input planet gears having toothed surfaces engaged with said inner toothed surface of said driven ring gear; and two sets of planet gears, each set including first and second output planet gears, each having toothed surfaces, one of said sets being rotatably disposed on a third carrier rod and the other of said sets rotatably being disposed on a fourth carrier rod, said toothed surfaces of said two sets of first and second output planet gears being engaged with said toothed surfaces of said two input planet gears, said toothed surfaces of said two input planet gears, further being engaged with said inner toothed surface of said first output ring gear and said toothed surfaces of said two second output planet gears further being engaged with said inner toothed surface of said second output ring gear.

15. The differential gear system of claim 14 wherein said means engaged with said outer toothed surface of said drive ring gear and said outer toothed surface of said driven ring gear for rotating said driven ring gear in response to rotation of said drive ring gear comprises a hydraulic log unit.

16. In combination with the differential gear system of claim 14, a dual permanent magnet generator comprising:

a prime mover coupled to said carrier; and two permanent magnet generators, one of said permanent magnet generators being coupled to said first output ring gear and the other of said permanent magnet generators being coupled to said second output ring gear.

17. In combination with the differential gear system of claim 14, a dual permanent magnet generator comprising:

a prime mover coupled to said carrier;

two permanent magnet generators, one of said permanent magnet generators being coupled to said first output ring gear and the other of said permanent magnet generators being coupled to said second output ring gear;

means for selecting a predetermined output frequency for said first permanent magnet generator; and means for sensing the output frequency of said first permanent magnet generator, wherein said hydraulic log unit includes means for adjusting the angular velocity of said driven ring gear in response to said sensed output frequency to maintain said output frequency at said predetermined value.

18. The differential gear system of claim 14 wherein said drive ring gear is disposed between said first and said second output ring gears.

19. A differential gear system comprising:

a plurality of spaced concentric gear rings, said ring gears including first and second output ring gears having inner and outer toothed surfaces, a drive ring gear having an outer toothed surface, and a driven ring gear having inner and outer toothed surfaces and disposed between said first and second output ring gears;

a carrier integral with said drive ring gear;

means engaged with said outer toothed surface of said drive ring gear and said outer toothed surface of said driven ring gear for rotating said driven ring gear in response to rotation of said drive ring gear;

two input planet gears rotatably disposed on first and second carrier rods, said input planet gears and said carrier rods being disposed within said ring gears, said input planet gears having toothed surfaces engaged with said inner toothed surface of said driven ring gear;

two sets of planet gears, each set including first and second output planet gears, each having toothed surfaces, one of said sets being rotatably disposed on a third carrier rod and the other of said sets rotatably being disposed on a fourth carrier rod, said toothed surfaces of said two sets of first and second output planet gears being engaged with said toothed surfaces of said two input planet gears, said toothed surfaces of said two first output planet gears further being engaged with said inner toothed surface of said first output ring gear and said toothed surfaces of said two second output planet gears further being engaged with said inner toothed surface of said second output ring gear, wherein said means engaged with said outer toothed surface of said drive ring gear and said outer toothed surface of said driven ring gear for rotating said driven ring gear in response to rotation of said drive ring gear comprises a hydraulic log unit, said hydraulic log unit further comprises:

means for sensing the angular velocity of the first output ring gear; and means responsive to said sensing means for adjusting the angular velocity of the driven ring gear to maintain the angular velocity of the first output ring at a predetermined value.

20. A mechanical differential comprising:

a carrier;

a plurality of spaced concentric ring gears, said ring gears including a drive ring gear integral with said carrier, first and second driven ring gears having inner and outer surfaces and an output ring gear having inner and outer surfaces;

means coupling the drive ring gear with the first and second driven ring gears;

two output planet gears rotatably disposed on first and second carrier rods, said output planet gears and said carrier rods being disposed radially within said ring gears, said output planet gears being engaged with said inner surface of said driven ring gear; and two sets of planet gears, each set including first and second input planet gears, one of said sets being rotatably disposed on a third carrier rod and the other of said sets rotatably disposed on a fourth carrier rod, said two sets of first and second input planet gears being engaged respectively with said two output planet gears, said two first input planet gears being further engaged with said inner surface of said first driven ring gear and said two second input planet gears further engaged with said inner surface of said second driven ring gear.

21. The mechanical differential of claim 20 wherein said means coupling the drive ring gear with the driven ring gear comprises a hydraulic log unit.

22. A mechanical differential comprising:

a carrier;

a plurality of spaced concentric ring gears, said ring gears including a drive ring gear integral with said carrier, first and second driven ring gears having inner and outer surfaces and an output ring gear having inner and outer surfaces;

means coupling the drive ring gear with the first and second driven ring gears;

two output planet gears rotatably disposed on first and second carrier rods, said output planet gears and said carrier rods being disposed radially within said ring gears, said output planet gears being engaged with said inner surface of said driven ring gear;

two sets of planet gears, each set including first and second input planet gears, one of said sets being rotatably disposed on a third carrier rod and the other of said sets rotatably disposed on a fourth carrier rod, said two sets of first and second input planet gears being engaged respectively with said two output planet gears, said two first input planet gears being further engaged with said inner surface of said first driven ring gear and said two second input planet gears further engaged with said inner surface of said second driven ring gear, wherein said means coupling the drive ring with the driven ring gear comprise a hydraulic log unit, said hydraulic log unit further comprises:

means for sensing the angular velocity of the output ring gear; and means responsive to the sensing means for adjusting the angular velocity of the first and second driven ring gears to maintain the angular velocity of the output ring gear at a predetermined value.

23. A differential gear system comprising:

a plurality of spaced concentric ring gears, said ring gears including first and second driven ring gears having inner and outer toothed surfaces, a drive ring gear having an outer toothed surface, and an output ring gear having inner and outer toothed surfaces and disposed between said first and second driven ring gears;

a carrier integral with said drive ring gear;

means engaged with said outer toothed surface of said drive ring gear and said outer toothed surfaces of said first and second driven ring gears for rotating said first and second driven ring gears in response to rotation of said drive ring gear;

two output planet gears rotatably disposed on first and second carrier rods, said output planet gears and said carrier rods being disposed within said ring gears, said output planet gears having toothed surfaces engaged with said inner toothed surface of said output ring gear; and two sets of planet gears, each set including first and second input planet gears, each having toothed surfaces, one of said sets being rotatably disposed on a third carrier rod and the other of said sets rotatably being disposed on a fourth carrier rod, said toothed surfaces of said two sets of first and second input planet gears being engaged with said toothed surfaces of said two output planet gears, said toothed surfaces of said two first input planet gears further being engaged with said inner toothed surface of said first driven ring gear and said toothed surfaces of said two second output planet gears further being engaged with said inner toothed surface of said second driven ring gear.

* * * * *